(12) United States Patent
Bernhard et al.

(10) Patent No.: US 7,739,693 B2
(45) Date of Patent: Jun. 15, 2010

(54) GENERIC APPLICATION PROGRAM INTERFACE FOR NATIVE DRIVERS

(75) Inventors: Sven Bernhard, Waldmohr (DE); Thorsten Stephan, Heidelberg (DE); Claudius Fischer, Schwetzingen (DE); Markus Schmidt-Karaca, Heidelberg (DE)

(73) Assignee: SAP AG, Walldorf (DE)

( * ) Notice: Subject to any disclaimer, the term of this patent is extended or adjusted under 35 U.S.C. 154(b) by 942 days.

(21) Appl. No.: 10/720,057

(22) Filed: Nov. 25, 2003

(65) Prior Publication Data

US 2004/0177361 A1  Sep. 9, 2004

Related U.S. Application Data (60) Provisional application No. 60/429,474, filed on Nov. 25, 2002, provisional application No. 60/429,470, filed on Nov. 25, 2002, provisional application No. 60/429,789, filed on Nov. 25, 2002, provisional application No. 60/429,859, filed on Nov. 26, 2002, provisional application No. 60/429,563, filed on Nov. 26, 2002, provisional application No. 60/429,690, filed on Nov. 26, 2002.

(51) Int. Cl.
*G06F 9/44* (2006.01)

(52) U.S. Cl. .................. 719/328; 719/321; 719/327

(58) Field of Classification Search .............. 719/321, 719/327, 328; 710/1–8; 358/1.13, 1.15
See application file for complete search history.

(56) References Cited

U.S. PATENT DOCUMENTS

| | | | | |
|---|---|---|---|---|
| 5,379,431 A | * | 1/1995 | Lemon et al. | 710/10 |
| 5,555,374 A | * | 9/1996 | Armerding et al. | 710/2 |
| 5,727,212 A | * | 3/1998 | Dinallo | 719/321 |
| 6,385,663 B2 | * | 5/2002 | Senator | 719/325 |
| 6,499,065 B2 | * | 12/2002 | Hyder et al. | 719/321 |
| 6,526,523 B1 | * | 2/2003 | Chen et al. | 714/38 |
| 6,538,763 B1 | * | 3/2003 | Klosterman et al. | 358/1.15 |
| 6,934,956 B1 | * | 8/2005 | Allen | 719/327 |
| 2002/0138564 A1 | * | 9/2002 | Treptow et al. | 709/203 |
| 2002/0147870 A1 | * | 10/2002 | Khanna | 710/107 |
| 2003/0231329 A1 | * | 12/2003 | Edmonds et al. | 358/1.13 |
| 2004/0225805 A1 | * | 11/2004 | Vasudevan | 710/305 |

* cited by examiner

*Primary Examiner*—Hyung S Sough
*Assistant Examiner*—Phuong N Hoang
(74) *Attorney, Agent, or Firm*—Kenyon & Kenyon LLP (57) ABSTRACT

A method and system to access native drivers in a computer using a generic application interface. An embodiment of the method may include providing the generic application interface to allow access to multiple peripheral devices, where the interface is independent of the device-specific features of the peripheral devices. The interface may include generic routines commonly shared by the peripheral devices. The method may further include using the interface to call the generic routines as a function of device-specific features of a particular device upon receipt of a request to access the particular device. The method provides a generic API that may be commonly used by a plurality of applications on a computer or a plurality of computers in a network to access a plurality of peripheral devices. As such, the developer or user may port applications based on the generic API between different computers without making modifications to the applications. Exemplary applications include mobile devices in wireless communication with network peripheral devices.

19 Claims, 6 Drawing Sheets

GENERIC APPLICATION PROGRAM INTERFACE FOR NATIVE DRIVERS

CROSS REFERENCE TO RELATED APPLICATIONS

This application claims priority to U.S. Provisional Application No. 60/429,474, filed Nov. 25, 2002, U.S. Provisional Application No. 60/429,470, filed Nov. 25, 2002, U.S. Provisional Application No. 60/429,789, filed Nov. 25, 2002, U.S. Provisional Application No. 60/429,859, filed Nov. 26, 2002, U.S. Provisional Application No. 60/429,563, filed Nov. 26, 2002, and U.S. Provisional Application No. 60/429,690, filed Nov. 26, 2002.

FIELD OF THE INVENTION

The present invention relates to the fields of information, computer software systems, and computer networks. In particular, embodiments of the present invention provide a generic application program interface for native drivers.

BACKGROUND

In general, a computer application uses an application programming interface (API) that provide API functionality specific to the peripheral devices accessible to the computer on which the application runs. As such, the application may be configured with API functions to receive and send data readable by the specific peripheral devices and to access device-specific implementations of peripheral features, e.g., printing, scanning, etc. The application API may readily cause the native drivers installed on the computer to execute and control the peripheral devices. This configuration advantageously provides an efficient operation for the application on this computer.

However, the application in that same form typically may not use those same API functions to access a similar feature on a different peripheral device. Nor may the application be ported to another computer for use with its peripheral devices. This is because the device-specific implementations of the peripheral features of the different or new peripheral devices are unrecognizable and incompatible with the application. Hence, the application is unable to access the native drivers of these peripheral devices. Therefore, in order to access the different or new peripheral devices, the application must undergo significant modification in order to add the device-specific functionality of these devices. This requires significant time and labor for a system developer.

With the emergence of large computer networks having computers with a plurality of operating systems and a variety of peripheral devices that provide the same, like, or different features, the current approach to application and API design is impractical. No system can afford the time and expense of providing related applications with APIs dependent on device-specific features for each and every permutation of the computers and their peripheral devices in the network.

Accordingly, there is a need in the art for a generic device-independent solution that may commonly be used among multiple applications and computers to access device-dependent features through the corresponding native drivers of the peripheral devices.

SUMMARY OF INVENTION

Embodiments of the present invention provide a method for accessing native drivers in a computer using a generic application programming interface. The method may include providing the generic application programming interface to access multiple peripheral devices, where the interface is independent of the specific features of the peripheral devices. The method may further include using the interface to call generic routines as a function of specific features of a particular device in order to access the particular device upon receiving a request.

Embodiments of the present invention also provide a system upon which the generic application programming interface may be implemented. The system may include at least one peripheral device having a native driver associated therewith and a computer having the generic application interface. The computer may be configured to provide the interface to an application to access the peripheral device, independent of the specific features of the device.

DETAILED DESCRIPTION

Embodiments of the present invention provide a method and system using a generic application programming interface (API) for native drivers to access peripheral devices. The generic API is able to support any device-specific implementation of a particular feature, e.g., printing, scanning, etc., on a peripheral device and cause its native driver to execute, independent of the particular feature of device. Thus, applications based on the generic API can be ported to different computers and used with different peripheral devices without modification. Accordingly, embodiments of the generic API of the present invention advantageously offer a device-independent access mechanism for applications to access the device-specific features on the peripheral device through the device's native driver.

Embodiments of the generic API further provide a great deal of flexibility such that many different types of peripheral devices can be represented in the generic API. Additionally, new features may be implemented with minimal or no disruption of the overall API framework.

Figure 1:
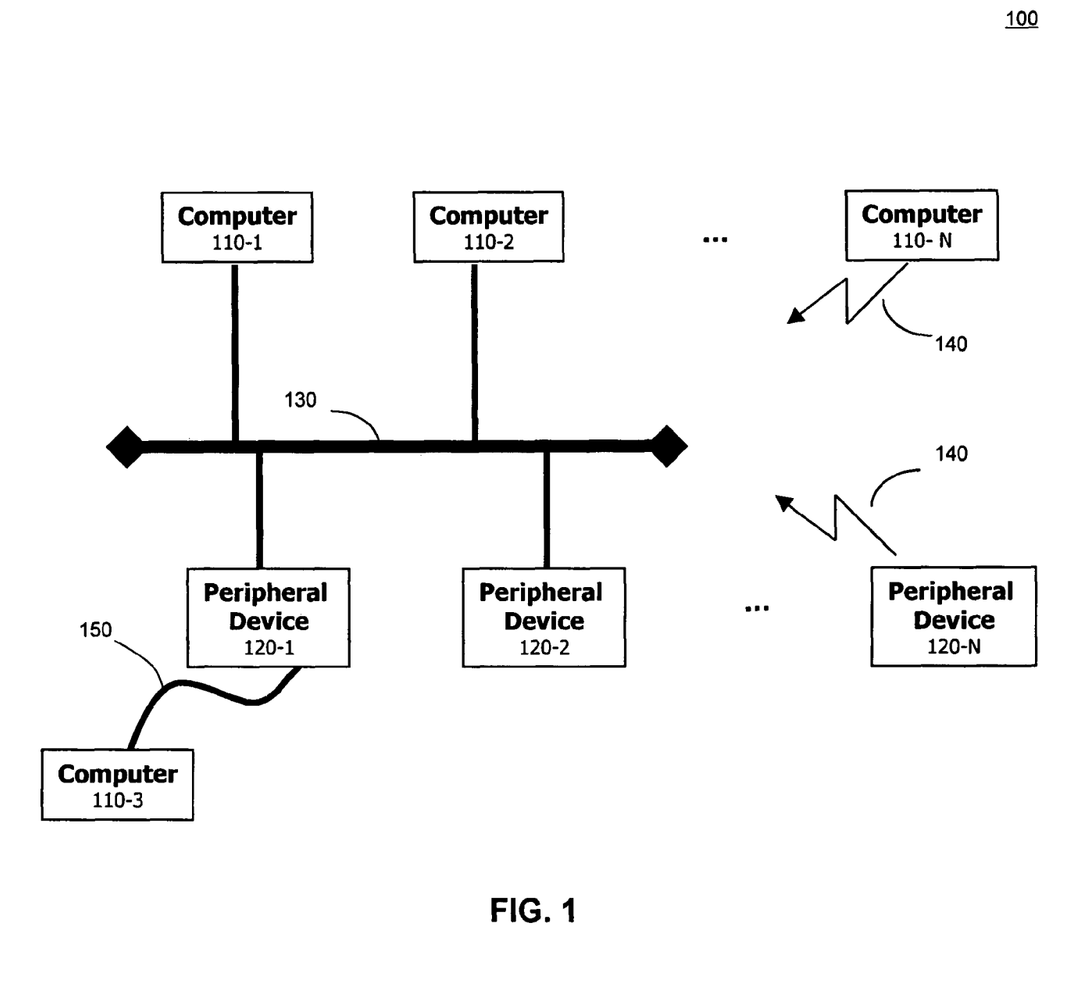
FIG. 1 is an overview of a system according to embodiments of the present invention.

FIG. 1 is an overview of a system according to embodiments of the present invention. The system may include one or more computers 110, which may be a desktop, a laptop, a handheld device, or any like device having a processor therein. The system may further include one or more peripheral devices 120 in communication with the computers 110. The peripheral devices 120 may include a printer, a scanner, an imager, a smart card reader, a USB port, or any like I/O device. The computers 110 may access the peripheral devices via a local area or wide area network 130, a wireless link 140, a direct connection 150, or any like transmission media.

Figure 2:
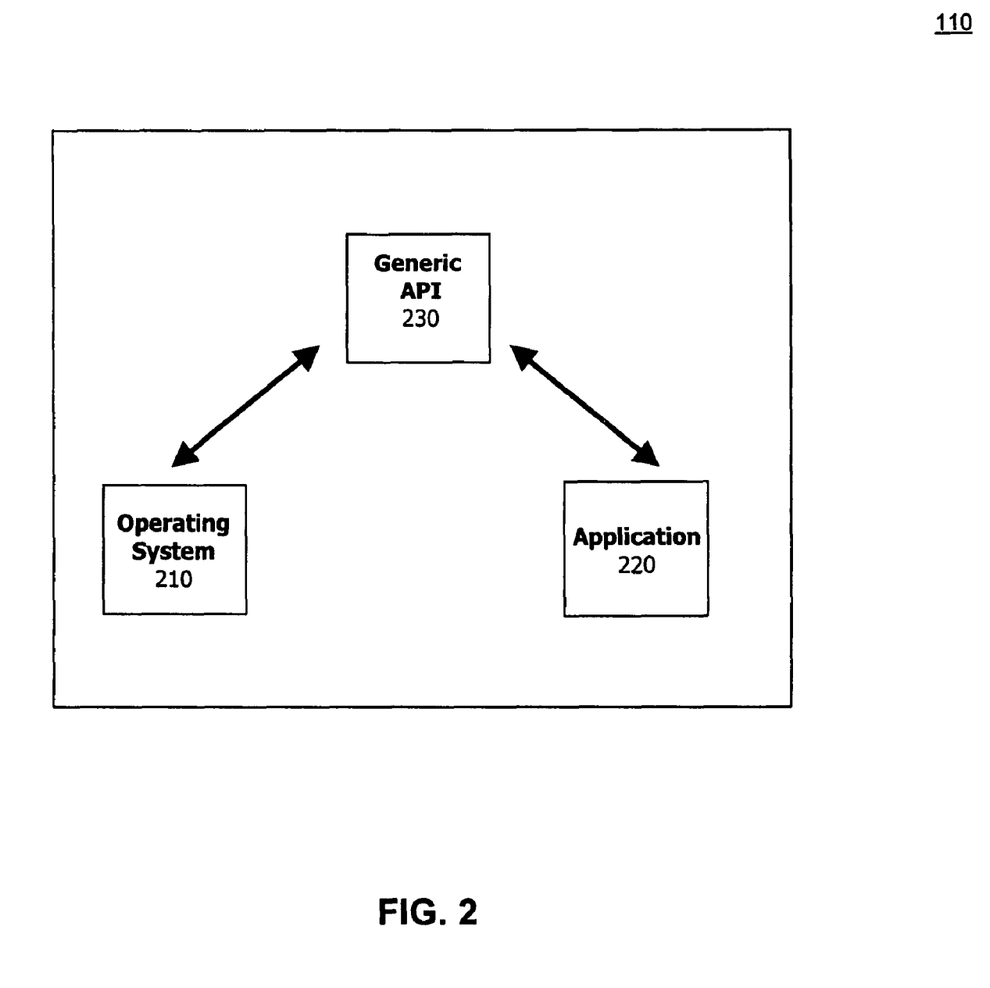
FIG. 2 is a diagram of a computer according to embodiments of the present invention.

FIG. 2 is a diagram of the computer 110 on which embodiments of the generic API may be implemented. The computer 110 may include an operating system (OS) 210, one or more applications 220, and the generic API 230. The application 220 may use the generic API 230 to command performance of some procedure by the operating system 210. The generic API 230 may in turn direct the operating system 210 to perform some procedure for the application 220. The operating system 210 may then control the allocation and usage of computer resources to carry out the application's 220 request.

In embodiments of the present invention, the application 220 may request through the generic API 230 that a particular peripheral feature be performed. Upon receiving the request, the generic API 230 may then direct the operating system 210 to access a particular peripheral device 120 to provide the requested feature. The operating system 210 may then cause the native driver associated with the particular device 120 to be executed, thereby providing the requested feature to the application 220, including receiving and sending data therebetween. As illustrated here, the application need not be dependent on the device-specific implementation of the requested feature. Instead, the application may request the feature in the abstract. To which, the generic API may direct access to the particular device through the device's native driver to provide a device-specific solution, where the solution may include generic routines commonly shared by peripheral devices that are called as a function of the device-specific features a particular peripheral device.

Figure 3:
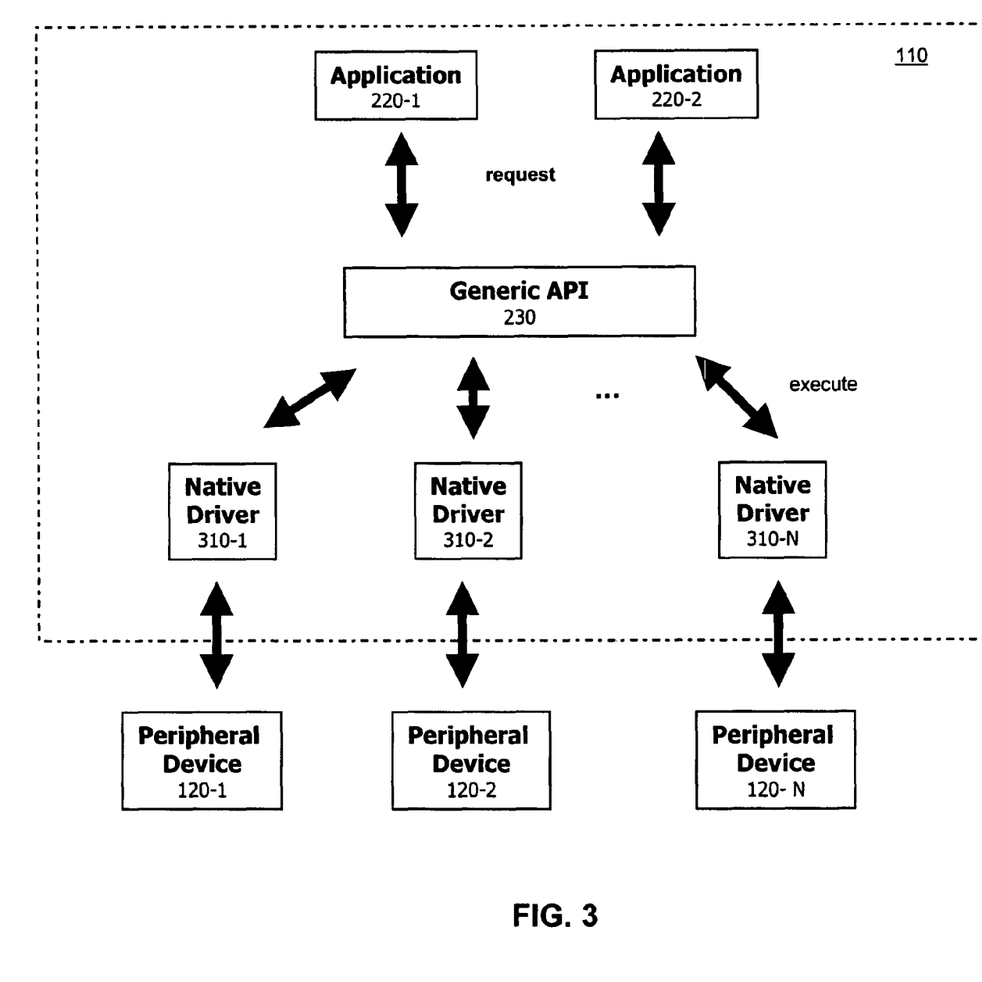
FIG. 3 is a diagram of an implementation of the generic native driver API according to embodiments of the present invention.

FIG. 3 is a diagram of an implementation of the generic API. In this embodiment, the computer 110 may include one or more applications 220, the generic API 230, and peripheral device native drivers 310. The application 220 may be in communication with the generic API 230 and the generic API 230 may be in communication with the native drivers 310. The native drivers 310 may in turn be in communication with the peripheral devices 120. Communication between the computer 110 and the peripheral devices 120 may be accomplished via a direct connection, a wireless link, a network, or any like transmission media.

As illustrated by FIG. 3, during implementation of embodiments of the present invention, one of the running applications 220 may send out a request to access a printer in order to print a document, for example. Peripheral device 120-N may be a printer. Accordingly, the generic API 230 may receive the print request, identify peripheral device N 120-N as the printer, call routines for printing from peripheral device N 120-N based on the parameters, configuration, etc., of peripheral device N 120-N, and then cause native driver N 310-N to execute in order to control peripheral device N 120-N. Upon access to peripheral device N 120-N, the application 220 may then transmit the data to be printed and peripheral device N 120-N may print it.

The generic API may be implemented with an object-oriented approach. An advantage of such an approach is that it provides efficient, self-contained entities to define the peripheral devices and group the complex details of their many features and options. The objects implemented by the generic API allows the API to group together complex features of each peripheral device into a small number of data structures such that the API may easily control the peripheral features. Additionally, the use of objects allows the API to group together features that are common to all the peripheral devices such that a developer need not reproduce representations of the same feature for each device and the computer need not store redundant representations. Additionally, upon implementation of new features for an existing device or an entirely new device, the generic API need not be disturbed greatly, but modification limited to particular entities.

It is to be understood that the generic API of the present invention is not limited to the object-oriented implementation described herein, but may be implemented in a variety of ways well known in the art.

Figure 4:
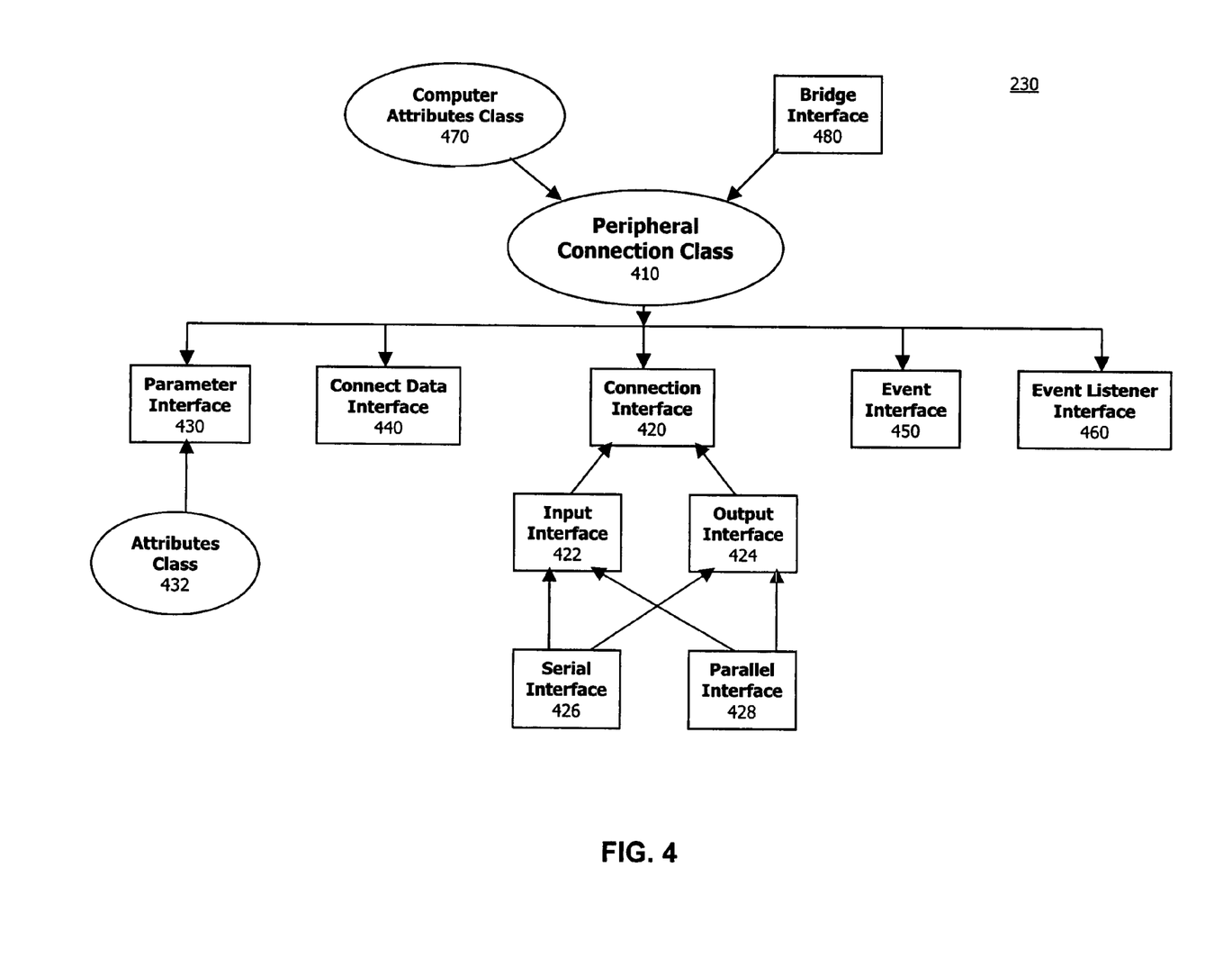
FIG. 4 is a class diagram of an exemplary implementation of the generic native driver API.

Such an object-oriented implementation is illustrated in FIG. 4. FIG. 4 is a class diagram of an exemplary implementation of the generic API. The generic API may operate such that similar features on different peripheral devices 120 are accessible through common methods. In embodiments of the present invention, the generic API 230 may receive a request from an application 220 to receive or send data to a particular peripheral device 120. The API 230 may then define a peripheral connection class which includes all the interfaces and classes that outline the basic functionality common to all the peripheral devices 120. The API 230 may then instantiate the peripheral connection class for the particular device 120 requested by the application. The instantiated peripheral connection class may in turn instantiate its classes and interfaces to include information specific to a particular device 120. The object created by the instantiation may then cause the native driver for the particular device 120 to be executed in order to communicate the application's 220 request to the device 120 and, therefore, control the device 120.

The peripheral connection class and its associated interfaces and classes are described as follows. The peripheral connection class 410 is the central class of the API. The peripheral connection class 410 may include a connection interface 420, a parameter interface 430, a connect data interface 440, an event listener interface 450, and an event interface 460. When the peripheral connection class is instantiated, the instantiated class includes the information specific to the requested peripheral device 120. The functionality of each of these components will be described below.

The connection interface 420 may outline the basic connection routines commonly used by all the peripheral devices 120. The connection interface 420 may include an input connection interface 422 and an output connection interface 424. The input interface 422 may outline the basic routines to be used to receive data from the peripheral device 120, including executing the native driver associated with a particular peripheral device 120 and performing data translation to make the data compatible with the requesting application 220. The output interface 424 may outline the basic routines to be used to send data to the peripheral device 120, including executing the native driver associated with a particular peripheral device 120 and performing data translation to make the data compatible with the peripheral device 120. The input and output interfaces 422, 424 may include a serial connection interface 426, which outlines the basic routines for serially connecting to the peripheral device 120, and a parallel connection interface 428, which outlines the basic routines for parallel connection to the peripheral device 120.

When the peripheral connection class 410 is instantiated, the connection interface, the input interface, the output interface, the serial interface, and the parallel interface are implemented to include those routines for connecting to the requested peripheral device 120.

The parameter interface 430 may outline the basic routines to be used to define the configuration parameters of the peripheral devices 120. The routines may include attribute classes 432 that define the complex attributes having many options of the peripheral devices 120. For example, a font associated with printer data may be represented by an attribute class that defines the font parameters, such as size, bold, italics, spacing, etc. When the API specifies a particular font to be used by a printer, an instance of the font class representing the requested font and its parameters may be passed to the printer. The attribute classes 432 advantageously allow a developer to add to the API additional classes corresponding to new options for a particular peripheral device 120 without affecting any application that accesses the attribute classes prior to the addition of the new options.

When the peripheral connection class 410 is instantiated, the attribute classes are instantiated to define the attributes of the requested peripheral device 120. The parameter interface is implemented to include those routines for configuring the requested peripheral device 120 based on the instantiated attribute classes.

The connect data interface 440 may outline the basic routines to be used to retrieve data from the peripheral device 120. The routines of the connect data interface 440 may include instructions and data structures for retrieving and storing data from a peripheral device 120. For example, the connect data interface implemented for a scanner may include a routine to get a barcode read by the scanner and store the barcode in a data record. The routines of the connect data interface 440 may also access the attributes classes 432 to identify the data attributes and communicate the attributes to the requesting application 220. For example, the connect data interface implemented for a scanner may use the instantiated attribute class to identify the barcode byte length and then communicate the length to the requesting application.

When the peripheral connection class 410 is instantiated, the connect data interface is implemented to include retrieval and storage routines for the requested peripheral device 120.

The event interface 450 may outline the basic routines for managing asynchronous input, i.e., requests. Asynchronous input may include events that are triggered by an application or a peripheral device. In an alternate embodiment, an event may be triggered by a user, another device, etc. In this embodiment, exemplary events may include a connect event, in which an application 220 requests access to the peripheral device 120, a disconnect event, in which an application 220 requests termination of access to the peripheral device 120, and a data event, in which the peripheral device 120 has data available for transmission to an application 220.

When the peripheral connection class 410 is instantiated, the event interface is implemented to include routines that manage asynchronous inputs involving the requested peripheral device 120.

The event listener interface 460 may outline the basic routines for calling an application when a data event occurs. When the peripheral connection class 410 is instantiated, the event listener interface is implemented to include routines to call the requesting application when a data event occurs in the requested peripheral device 120. The routines include an implementation of the connect data interface 440 to retrieve the data from the peripheral device 120.

The peripheral connection class may access a computer attributes class 470 which provides diagnostic information about the computer 110 on which the API is installed. The computer attributes class 470 may provide identifying information about the model of the computer 110 and the peripheral devices 120 currently accessible to the API. The API may access the computer attributes class 470 to ensure that the peripheral device requested by the application is part of the API.

When the generic API is initialized, the computer attributes class may be instantiated to provide the attributes of the computer 110 running the API.

The peripheral connection class may also access a bridge interface 480, e.g., a Java™ Native Interface (JNI), to provide a bridge between the generic API and routines written in other programming languages. For example, the bridge interface 480 may provide a bridge between the generic API and the peripheral device drivers 410 and other external applications. The bridge interface 480 may ensure that each peripheral device 120 only has one active access from the applications on the API. As such, the API may provide to an application exclusive access to the peripheral device 120. If a second application tries to establish a connection to the peripheral device, the API may generate an error message. In an alternate embodiment, if a peripheral device 120 supports simultaneous access by separate applications, then the API may allow for this because the connection parameters of the peripheral device 120 will include this capability.

When the generic API is initialized, the bridge interface may be implemented to provide a bridge between the generic API and external software with which the generic API will interact.

Figure 5:
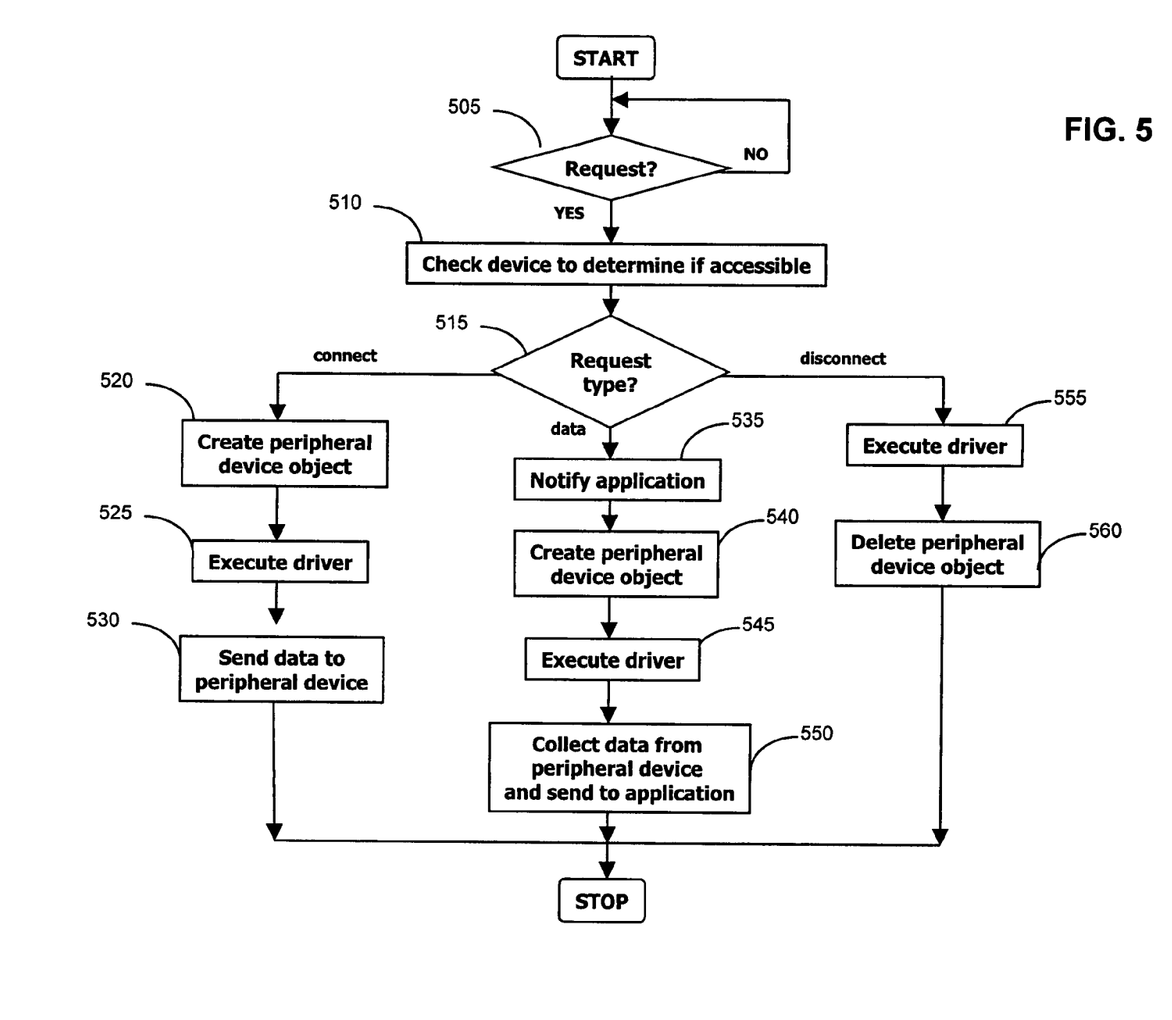
FIG. 5 is a flowchart of an embodiment of a method executing the generic native driver API.

FIG. 5 is a flowchart of a method according to an embodiment of the present invention. The API may receive (505) a request (or event) regarding a peripheral device. The API may then check (510) whether the peripheral device is accessible and the appropriate routines are installed on the computer.

If the check is not successful, the API may issue an error message. If the check is successful, then the API may determine (515) the nature of the request.

If the request is an application's request to access a peripheral device, then the API may instantiate (520) the peripheral connection class and its interfaces associated with the requested peripheral device. The object created by instantiation may then cause (525) the native driver of the requested peripheral device to execute and control the peripheral device. The API may then send (530) data to the requested peripheral device in order for the device to perform the application's request.

If the request is a peripheral device's request to transmit data to an application, then the API may notify the application (535) that data is available from the peripheral device. The API may then instantiate (540) the peripheral connection class and its interfaces associated with the peripheral device. The object created by instantiation may then cause (545) the native driver of the peripheral device to execute and control the peripheral device. The API may then collect (550) the data from the peripheral device using the implemented connect data interface and send the data to the application.

If the request is an application's request to terminate access to a peripheral device, then the object of the existing instantiated peripheral connection class may cause (555) the native driver of the peripheral device to execute and disconnect the peripheral device. The API may then uninstantiate (560) the peripheral connection class, thereby deleting the object.

Figure 6:
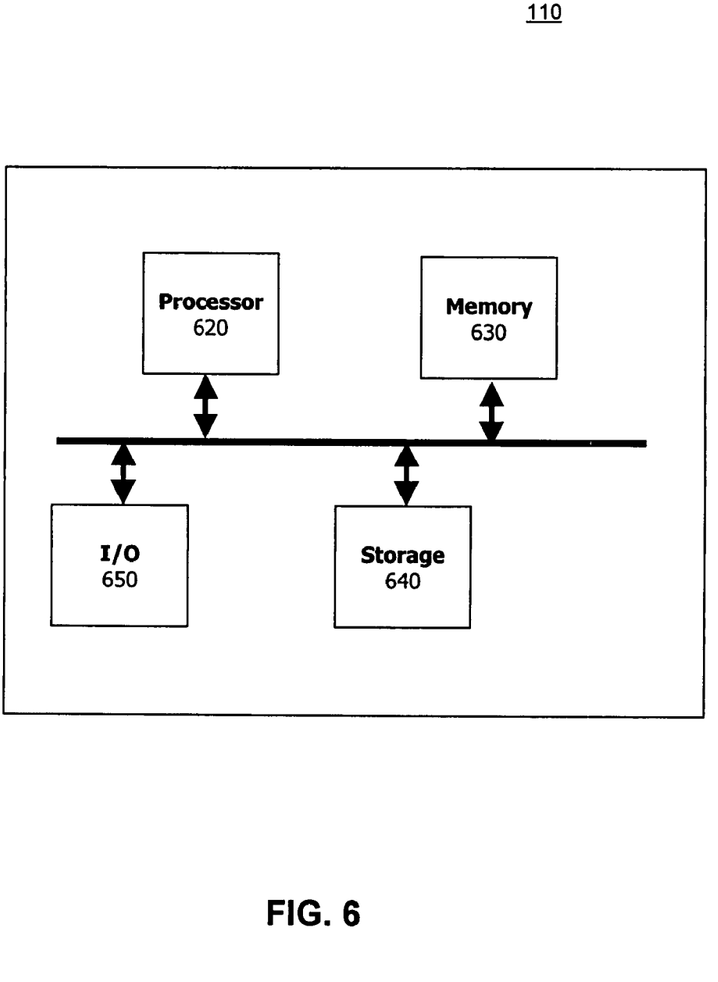
FIG. 6 is a diagram of an exemplary computer for implementing embodiments of the present invention.

FIG. 6 is a block diagram of an exemplary computer that can implement embodiments of the present invention. The computer 110 may access peripheral devices according to embodiments of the present invention. The computer 110 may include, but is not limited to, a processor 620 provided in communication with a system memory module 630, a storage device 640, and an I/O device 650. The processor 620 may execute the generic API, applications, and the operating system. The memory 630 may store program instructions to be executed by the processor 620 and also may store variable data generated pursuant to program execution. In practice, the memory 630 may be a memory system including one or more electrical, magnetic, or optical memory devices. The I/O device 650 may include a communication port for communication with the peripheral devices 120 to receive and transmit data between the peripheral devices 120 and the computer 110.

Prior to real-time operation of the generic API in the computer 110, the API may be tested using an emulator that simulates interaction with the peripheral devices 120. The emulator may allow a developer to tests all execution paths in the applications that would be used in real-time to access the peripheral devices 120. The emulator may also allow the developer to set up simulations of one or more peripheral devices, in which the behavior and attributes of the peripheral devices may be configured. After the devices are configured in the emulator, the developer may trigger peripheral data input to the application via an emulator display window, for example. The application may then process the data as it would for the real peripheral device.

In an alternate embodiment, the API may provide functionality allowing selection of a subset of the peripheral devices accessible by a particular application or a particular computer. The embodiment may provide a selection wizard that allows the developer to select the subset of devices. In one embodiment, the selection wizard may be implemented as a web-based user interface tool that guides the developer through a series of prompts until the subset of devices is selected. Accordingly, the drivers for the selected devices may be deployed to the computer for future access by the generic API.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
providing a connection class to include generic routines to connect to peripheral devices, the connection class to be independent of device-specific features of the peripheral devices;
providing a plurality of parameters to define specific features of the peripheral devices;
receiving a request to access one of the peripheral devices;
determining whether the requested peripheral device is accessible;
if the request is a request to connect a computer to the requested peripheral device and the requested peripheral device is accessible,
instantiating the connection class to create an object specific to the requested peripheral device,
using the instantiated object to cause a native driver of the requested peripheral device to execute, and
connecting, through the native driver, the computer to the requested peripheral device based upon the parameters of the requested peripheral device; and
if the request is a request from the requested peripheral device to send data to the computer,
notifying the computer that the requested peripheral device has the data,
instantiating the connection class to create an object specific to the requested peripheral device,
using the instantiated object to cause the native driver of the requested peripheral device to execute,
connecting, through the native driver, the computer to the requested peripheral device; and
sending the data from the requested peripheral device to the computer.

2. The method of claim 1, further comprising:
if the request is a request to disconnect the computer from the requested peripheral device,
using the instantiated object of the connection class to cause the native driver of the requested peripheral device to execute,
disconnecting, through the native driver, the computer from the requested peripheral device, and
uninstantiating the connection class to delete the instantiated object.

3. The method of claim 1, wherein the peripheral devices are selected from a group consisting of a printer, a scanner, an imager, a smart card reader, and a barcode reader.

4. The method of claim 1, further comprising:
providing an emulator to simulate access to the peripheral devices in order to test the connection class.

5. The method of claim 1, further comprising:
providing a graphical user display to allow a user to select the peripheral devices to be accessible by the connection class; and
providing native drivers corresponding to the selected peripheral devices.

6. The method of claim 1, wherein the connection class includes input and output interfaces that further include serial and parallel connection interfaces to communicate with the peripheral devices.

7. A system comprising:
one or more peripheral devices having associated therewith native drivers;
a memory device storing a plurality of parameters to define specific features of the one or more peripheral devices and
a mobile computer configured to:
provide a connection class to an application, the connection class to include generic routines to connect to the one or more peripheral devices, the connection class to be independent of device-specific features of the one or more peripheral devices;
provide a plurality of parameters to define specific features of the one or more peripheral devices;
receive a request to access one of the one or more peripheral devices;
determine whether the requested peripheral device is accessible;
if the request is a request to connect the mobile computer to the requested peripheral device and the requested peripheral device is accessible,
instantiate the connection class to create an object specific to the requested peripheral device,
use the instantiated object to cause a native driver of the requested peripheral device to execute, and
connect, through the native driver, the computer to the requested peripheral device based upon the parameters of the requested peripheral device; and
if the request is a request from the requested peripheral device to send data to the mobile computer,
notify the mobile computer that the requested peripheral device has the data,
instantiate the connection class to create an object specific to the requested peripheral device,
use the instantiated object to cause the native driver of the requested peripheral device to execute,
connect, through the native driver, the computer to the requested peripheral device; and send the data from the requested peripheral device to the computer.

8. The system of claim 7, further comprising:
a second mobile computer, having the application ported thereto, configured to access a different peripheral device with the application, wherein the application on the second mobile computer uses the connection class to access the different peripheral device without modifying the application.

9. The system of claim 7, wherein the mobile computer uses the connection class to limit communication with the one or more peripheral devices to one request at a time.

10. The system of claim 7, wherein the peripheral devices are selected from a group consisting of a printer, a scanner, an imager, a smart card reader, and a barcode reader.

11. The system of claim 7, wherein the mobile computer is further configured to:
provide an emulator to simulate access to the peripheral devices in order to test the connection class.

12. The system of claim 7, wherein the mobile computer is further configured to:
provide a graphical user display to allow a user to select the peripheral devices to be accessible by the connection class; and
provide native drivers corresponding to the selected peripheral devices.

13. The system of claim 7, wherein the connection class includes input and output interfaces that further include serial and parallel connection interfaces to communicate with the peripheral devices.

14. Computer readable storage medium storing thereon program instructions that, when executed, cause an executing device to perform the steps of:
providing a connection class to include generic routines to connect to peripheral devices, the connection class to be independent of device-specific features of the peripheral devices;
providing a plurality of parameters to define specific features of the peripheral devices;
receiving a request to access one of the peripheral devices;
determining whether the requested peripheral device is accessible;
if the request is a request to connect a computer to the requested peripheral device and the requested peripheral device is accessible,
instantiating the connection class to create an object specific to the requested peripheral device,
using the instantiated object to cause a native driver of the requested peripheral device to execute, and
connecting, through the native driver, the computer to the requested peripheral device based upon the parameters of the requested peripheral device; and
if the request is a request from the requested peripheral device to send data to the computer,
notifying the computer that the requested peripheral device has the data,
instantiating the connection class to create an object specific to the requested peripheral device,
using the instantiated object to cause the native driver of the requested peripheral device to execute,
connecting, through the native driver, the computer to the requested peripheral device; and
sending the data from the requested peripheral device to the computer.

15. The computer readable medium of claim 14, further comprising instructions that cause the executing device to perform the steps of:
if the request is a request to disconnect the computer from the requested peripheral device,
using the instantiated object of the connection class to cause the native driver of the requested peripheral device to execute,
disconnecting, through the native driver, the computer from the requested peripheral device, and
uninstantiating the connection class to delete the instantiated object.

16. The computer readable medium of claim 14, wherein the peripheral devices are selected from a group consisting of a printer, a scanner, an imager, a smart card reader, and a barcode reader.

17. The computer readable medium of claim 14, further comprising instructions that cause the executing device to perform the steps of:
providing an emulator to simulate access to the peripheral devices in order to test the connection class.

18. The computer readable medium of claim 14, further comprising instructions that cause the executing device to perform the steps of:
providing a graphical user display to allow a user to select the peripheral devices to be accessible by the connection class; and
providing native drivers corresponding to the selected peripheral devices.

19. The computer readable medium of claim 14, wherein the connection class includes input and output interfaces that further include serial and parallel connection interfaces to communicate with the peripheral devices.

* * * * *